United States Patent [19]

Tsuchiya et al.

[11] Patent Number: 4,755,925
[45] Date of Patent: Jul. 5, 1988

[54] PLANT DIAGNOSTIC SYSTEM

[75] Inventors: Minoru Tsuchiya; Kazunori Ohmori, both of Fuchu, Japan

[73] Assignee: Kabushiki Kaisha Toshiba, Kanagawa, Japan

[21] Appl. No.: 910,687

[22] Filed: Sep. 23, 1986

[30] Foreign Application Priority Data

Sep. 24, 1985 [JP] Japan .................................. 60-208767

[51] Int. Cl.$^4$ ............................................. G05B 13/04
[52] U.S. Cl. ................................... 364/150; 364/184; 364/151; 364/156; 364/185
[58] Field of Search ............... 364/150, 151, 156, 157, 364/551, 184, 185

[56] References Cited

U.S. PATENT DOCUMENTS

| | | | |
|---|---|---|---|
| 4,349,869 | 9/1982 | Prett et al. ...................... | 364/156 X |
| 4,410,950 | 10/1983 | Toyoda et al. ................... | 364/492 X |
| 4,517,468 | 5/1985 | Kemper et al. .................. | 364/551 X |
| 4,578,747 | 3/1986 | Hideg et al. ..................... | 364/157 X |
| 4,630,189 | 12/1986 | Ohmori et al. ................... | 364/150 |

Primary Examiner—Jerry Smith
Assistant Examiner—Steve Hoang
Attorney, Agent, or Firm—Foley & Lardner, Schwartz, Jeffery, Schwaab, Mack, Blumenthal & Evans

[57] ABSTRACT

A plant diagnostic system is disclosed wherein a plant to be diagnosed is expressed as an auto regressive model. A correlation function with respect to a difference obtained on the basis of an estimated value based on the auto regressive model and a plant value of the plant to be diagnosed is calculated. There is additionally provided a time constant determination unit for determining a time constant at which a change of one plant value has the greatest influence on that plant value or other plant values by using a coefficient matrix of the auto regressive model. This enables calculation of the correlation function in consideration of the time constant of the plant to be diagnosed. In this manner, an identification of an abnormality or failure source which is in conformity with the characteristic of the plant to be diagnosed can be conducted.

3 Claims, 3 Drawing Sheets

PLANT DIAGNOSTIC SYSTEM

BACKGROUND OF THE INVENTION

The present invention relates to a plant diagnostic system which diagnoses plants e.g., power generation plant etc.

In recent years, various plant diagnostic techniques have been studied with respect to plant processes such as the power generation process, and research and development related thereto are briskly conducted. As one of results of such research and development, there is a plant diagnostic system which has been already proposed by the inventors of the present invention and others (see Japanese Patent Application No. 58-102736).

According to this system, a plant to be diagnosed is expressed as an AR (Auto Regressive) model as shown in the following equation (1), and a residual $\epsilon(s)$ between an estimated value $X(s)$ calculated based on this model and an actual plant value $\widehat{X}(s)$ is calculated using the following equation (2). Then, whiteness of the residual $\epsilon$ thus obtained is qualified, thereby to recognize whether the plant is in and abnormal condition or not.

$$\widehat{X}(s) = \sum_{m=1}^{M} A(m) \cdot X(s - m), \quad (1)$$

where $\widehat{X}(s)$ is an estimated value of a plant value at a sampling time s, A is an AR coefficient matrix, $X(s)$ is a plant value at the sampling time s and is expressed as $$X = \begin{pmatrix} x_1 \\ x_2 \\ x_3 \\ \vdots \\ x_n \end{pmatrix},$$

and M is degree of the AR model.

$$\epsilon(s) = X(s) - \widehat{X}(s) \quad (2)$$

where $\epsilon(s)$ is a residual at the sampling time s and is expressed as $$\epsilon = \begin{pmatrix} \epsilon_1 \\ \epsilon_2 \\ \epsilon_3 \\ \vdots \\ \epsilon_n \end{pmatrix}.$$

In the above-mentioned plant diagnostic system, a correlation function $\phi_{ij}$ used for qualification of whiteness of the residual was obtained using the following equation (3):

$$\phi_{ij} = \frac{\sum_{s=1}^{N} \epsilon_i(s) \cdot \epsilon_j(s + 1)}{\sqrt{\sum_{s=1}^{N} \epsilon_i(s)^2} \cdot \sqrt{\sum_{s=1}^{N} \epsilon_j(s + 1)^2}} \quad (3)$$

where i and j are item numbers attached to plant values, N is the number of samples of the residual used for calculation of the correlation function, and $\phi_{ij}$ is the correlation function with respect to the item number j of the item number i, which represents auto-correlation function when i=j and cross-correlation function when i≠j.

By using the correlation function $\phi_{ij}$ obtained from the above-mentioned equation (3), a whiteness qualification index $AL_{ij}$ defined as the following equation (4) is obtained.

$$AL_{ij} = \frac{\sqrt{N - 3}}{2} \log \frac{1 + \phi_{ij}}{1 - \phi_{ij}} \quad (4)$$

Then, by making use of the characteristic that $AL_{ij}$ depends upon the normal distribution N(0, 1) (having the average of 0 and the dispersion of 1), a threshold level is determined in accordance with the erroneous diagnostic level.

There was conducted a qualification such that when the following equation (5) holds, the correlation between the residuals $\epsilon_i$ and $\epsilon_j$ exists and this has no whiteness.

$$|AL_{ij}| > ARL \quad (5)$$

In accordance with the above-mentioned diagnostic system, a typical abnormality or failure in the plants can be identified, but since information as to the time constant related to the dynamic characteristic of the plant is not included in the above equation (3) for calculating the correlation function $\phi_{ij}$, an identification of abnormality or failure in consideration of the time constant of the plant to be diagnosed such that influence of the abnormality at a certain portion would be spread to another portion with a certain time delay could not be conducted.

SUMMARY OF THE INVENTION

It is an object of the present invention to further improve the plant diagnostic system previously proposed and to provide a plant diagnostic system having higher reliability which can conduct an identification of an abnormality or failure in consideration of a time constant.

To achieve this object, the present invention is characterized by the following implementation. To the plant diagnostic section previously proposed, a time constant determination unit is added. From the plant diagnostic model, an AR coefficient matrix A is input. By using this value, how a change in one plant value affects this plant value or other plant values is examined and the time (time constant) which has the strongest influence on this change is determined. Then, a correlation function $\phi_{ij}$ is calculated in consideration of the time constant thus determined, thus making it possible to conduct an identification of a abnormality or failure source which is in conformity with the characteristic of the plant to be diagnosed.

DETAILED DESCRIPTION OF THE PREFERRED EMBODIMENT

A plant diagnostic system to which time constant determination means according to the present invention is added will be described in connection with a preferred embodiment with reference to attached drawings.

Figure 1:
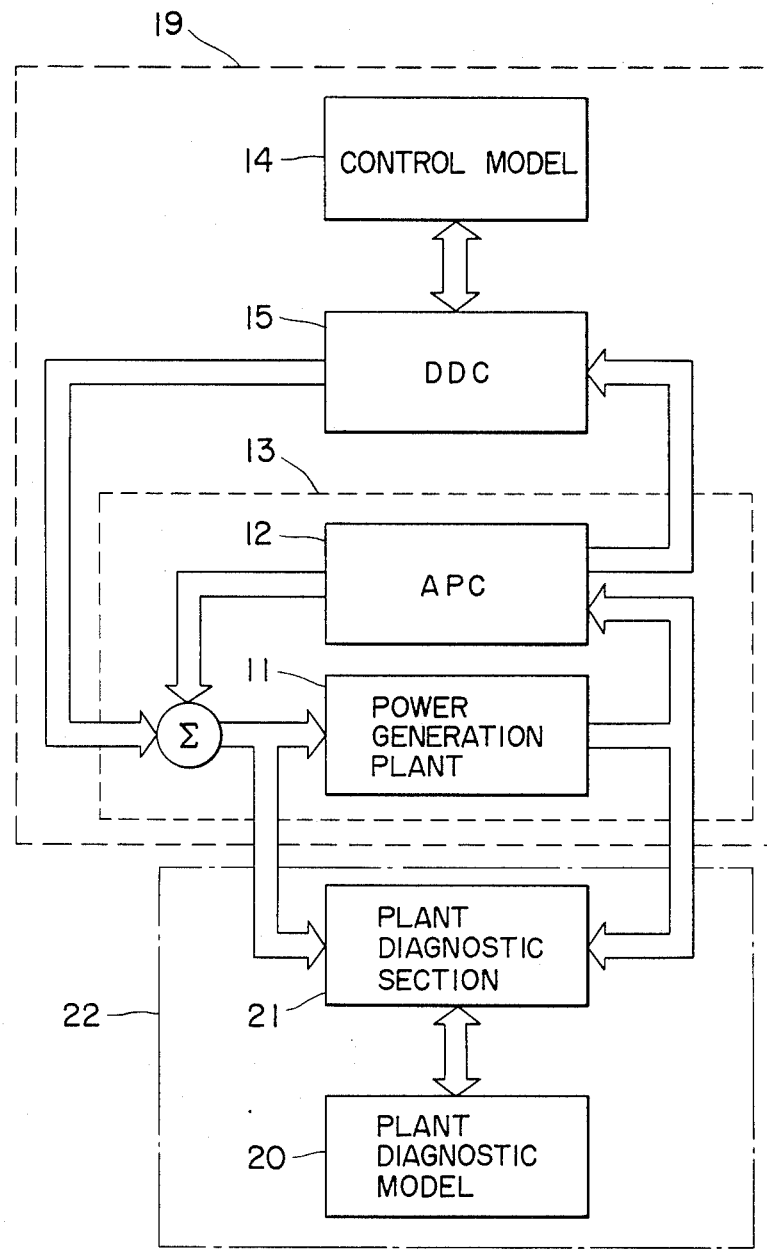
FIG. 1 is a block diagram illustrating an embodiment of a plant diagnostic system according to the present invention.

FIG. 1 shows the entire construction of a plant diagnostic system in an embodiment of the present invention. The plant diagnostic system in this embodiment comprises a power generation plant 11, and an analog control unit (which will be called "APC" hereinafter) 12 which receives variables indicative of plant state fed back from the power generation plant 11 to apply ordinary PID control to the power generation plant 11. The entirety of the state where the APC 12 is controlling the power generation plant 11 is called an "object 13 to be controlled" herein and a control model 14 is obtained by expressing the object 13 to be controlled using a numerical model such as an auto regressive model (which will be referred to as an "AR model" hereinafter).

The plant diagnostic system further comprises a digital control unit (which will be called a "DDC" hereinafter) 15 for applying an optimum control to the power generation plant 11 using such a control model 14. The DDC 15 receives feedback signals from the APC 12 to correct the output of the APC 12 for placing the power generation plant 11 in an optimum state on the basis of the control model 14 which expresses, using the AR model, the entire state where the APC 12 is controlling the power generation plant 11.

The above-mentioned components, i.e., the entirety of the control system including the power generation plant 11, the APC 12, the control model 14 and the DDC 15 will be called an "object 19 to be diagnosed". By expressing the object 19 to be diagnosed using the AR model, a plant diagnostic model 20 is obtained. Namely, the plant diagnostic model 20 is expressed as the AR model shown in the equation (1) by changing e.g. an addition command value at random using the M-series signal (maximum length linear shift register sequence) etc. in the state where both the APC 12 and the DDC 15 are controlling the power generation plant 11, thereby to identify the object 19 to be diagnosed. Further, the plant diagnostic system includes a plant diagnostic section 21 which diagnoses abnormality of the object 19 to be diagnosed using this plant diagnostic model 20. Namely, the plant diagnostic section 21 receives the sum total of manipulation signals output from both the APC 12 and the DDC 15 to the power generation plant 11 and the feedback signals from the power generation plant 11 to qualify whiteness of the time series of difference obtained from each deviation signal between these values and an estimated value from the plant diagnostic model 20, thereby to detect presence or absence of occurrence of failure, or a portion in an abnormal condition due to the influence of the failure to inform an operator of this fact.

The above-mentioned construction is the same as the plant diagnostic system which has been previously proposed, but the plant diagnostic system in this embodiment of the invention differs from the previously proposed one in that the former system is provided in the plant diagnostic section 21 with means for determining time constant, thus to qualify whiteness of the time series of difference in consideration of the time constant determined.

Figure 2:
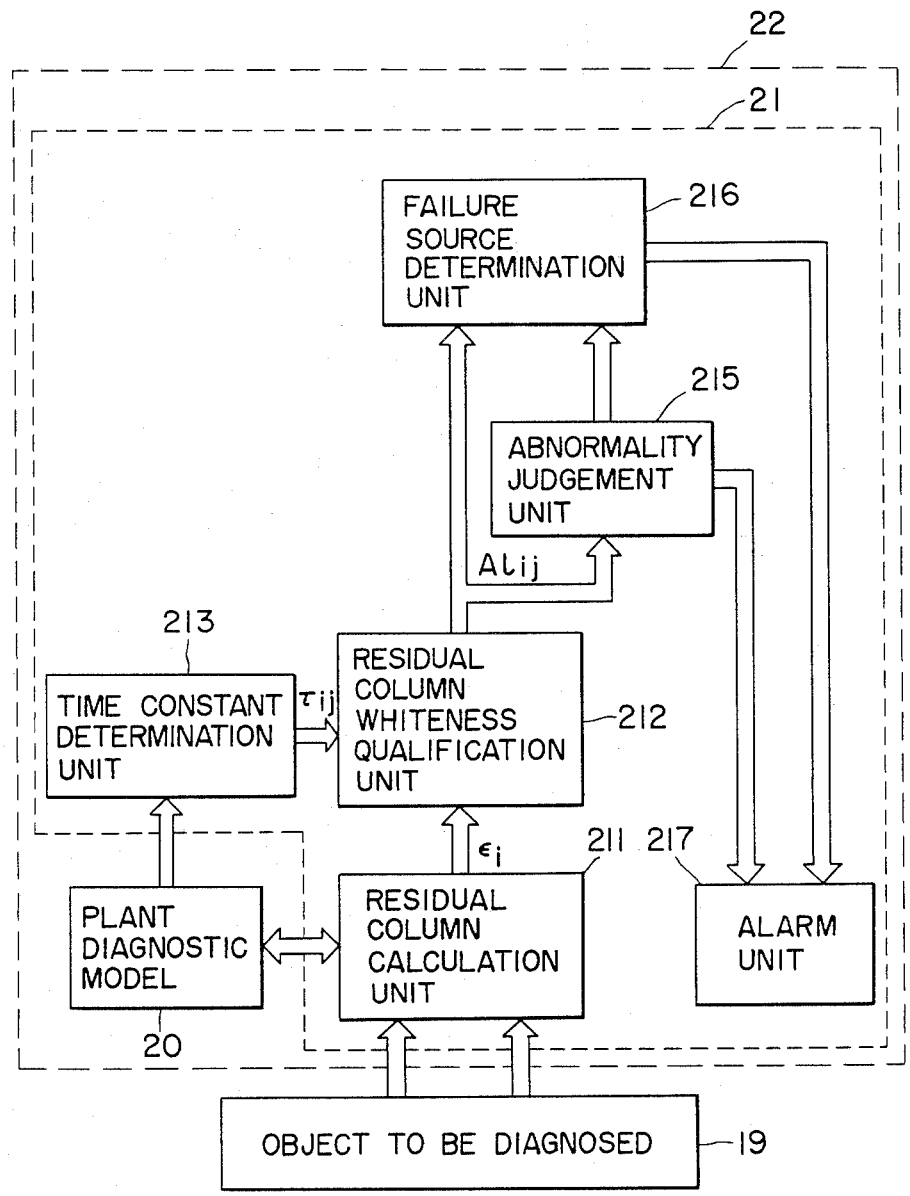
FIG. 2 is a block diagram schematically illustrating a plant diagnostic section employed in the system shown in FIG. 1.

FIG. 2 shows the detail of the plant diagnostic section 21 which includes a time series of difference calculation unit 211, a time series of difference whiteness qualification means 212, a time constant determination means 213, an abnormality judgement means 215, a failure source determination means 216, and an alarm unit 217.

In this example shown, plant signals such as plant manipulation signals and state signals which are this time applied from the object 19 to be diagnosed to the plant diagnostic section 21 are input from the time series of difference calculation means 211 to the plant diagnostic model 20, at which the next estimated value is calculated and this value is fed back to the time series of difference calculation means 211.

The time series of difference calculation means 211 calculates the time series of difference $\epsilon_i$ (i represents an item number of the plant diagnostic model 20) i.e., a time series of difference between an estimated value and an actual value in respect of each plant value on the basis of the estimated value from the plant diagnostic model 20 and a value read from the object 19 to be diagnosed. After the deviation is calculated, the time series of difference calculation unit 211 calculates an average per each item to calculate a residual by subtracting the average from respective deviations to output the time series of differnce $\epsilon_i$ to the time series of difference whiteness qualification unit 212.

The time constant determination unit 213 inputs AR model coefficient matrices $A(1), A(2), \ldots, A(M)$ of the AR model expressed by the equation (1) from the plant diagnostic model 20 to calculate an impulse response $I_i(\tau)$ given by the change of a plant value (the item number i) with respect to the change of a plant value (the item number j) in accordance with the following equations (6.1), (6.2), (6.3) and (6.4).

The time constant determination unit 213 inputs AR model coefficient matrices $A(1), A(2), \ldots, A(M)$ of the AR model expressed by the equation (1) from the plant diagnostic model 20 to calculate an impulse response $a_{ij}(\tau)$ given by the change of a certain plant value (item number i) with respect to the change of a certain plant value (item number j) to obtain the sampling time which has the strongest influence on such a change.

For instance, the relationship expressed below holds in connection with the model of M=2 by the equation (1).

$$X(s) = A(1) \; (s-1) + A(2) X(s-2) \tag{6.1}$$

To what degree the change of the plant value before one sample affects is calculated by the following equation.

$$X(s) = A(1) X(s-1) \tag{6.2}$$

A value of the item number j in the $X(s)$ when only a value of the item number i is set to 1 and values of other item numbers are set to 0 in the $X(s-1)$ of the equation (6.2) is an impulse response given by the change of the plant value (item number i) before one sample with respect to the change of a certain value (the item number j).

For instance, when the model of $M=2$ is employed, i.e., the number of items is 2, the equation (6.1) is expressed as follows.

$$\begin{pmatrix} x_1(s) \\ x_2(s) \end{pmatrix} = \begin{pmatrix} A_{11}(1) A_{12}(1) \\ A_{21}(1) A_{22}(1) \end{pmatrix} \begin{pmatrix} x_1(s-1) \\ x_2(s-1) \end{pmatrix} + \begin{pmatrix} A_{11}(2) A_{12}(2) \\ A_{21}(2) A_{22}(2) \end{pmatrix} \begin{pmatrix} x_1(s-2) \\ x_2(s-2) \end{pmatrix} \quad (6.1)$$

The impulse response given by the item number 2 before one sample to the item number 1 ($x_1(s)$) is calculated as follows.

(1) An impulse response $a_{12}(1)$ given by the item number 2 ($x_2(s-1)$) before one sample with respect to item number 1 ($x_1(s)$) is equal to a value of $x_2(s)$ in the equation (6.1) when $x_1(s-1)=1$ and $x_2(s-1)=0$ in the following equation:

$$\begin{pmatrix} x_1(s) \\ x_2(s) \end{pmatrix} = \begin{pmatrix} A_{11}(1) A_{12}(1) \\ A_{21}(1) A_{22}(1) \end{pmatrix} \begin{pmatrix} x_1(s-1) \\ x_2(s-1) \end{pmatrix}$$

Namely, $a_{12}(1)=A_{21}(1)$.

(2) An impulse response $a_{12}(2)$ before two samples is equal to a value of $x_2(s)$ in the equation (6.1) when $x_2(s-2)=1$ and $x_2(x-2)=0$. Namely, $a_{12}(2)=A_{21}(1)x_1(s-1)+A_{22}(1)x_2(s-1)+A_{21}(2)$.

In the above-mentioned equation, the relationship expressed below holds:

$$\begin{pmatrix} x_1(s-1) \\ x_2(s-1) \end{pmatrix} = \begin{pmatrix} A_{11}(1) A_{12}(1) \\ A_{21}(1) A_{22}(1) \end{pmatrix} \begin{pmatrix} x_1(s-2) \\ x_2(s-2) \end{pmatrix}$$

In this case, the following relationships hold in connection with the item numbers 1 and 2:
$$x_1(s-1)=A_{11}(1)=a_{11}(1),$$

and $$x_2(s-1)=A_{21}(1)=a_{12}(1).$$

Accordingly, the impulse response $a_{12}(2)$ is expressed as follows.

$$a_{12}(2)=A_{21}\cdot a_{11}(1)+A_{22}(1)\cdot a_{12}(1)+A_{21}(2) \quad (6.2)$$

Further, the impulse response $a_{11}(2)$ given by the item number 1 before two samples with respect to the item number 1 is expressed as follows.

$$a_{11}(2)=A_{11}(1)\cdot a_{11}(1)+A_{12}(1)\cdot a_{12}(1)+A_{11}(2) \quad (6.3)$$

When the equation (6.2) and the equation (6.3) are combined with each other, the impulse response $$I_1(2) = \begin{pmatrix} a_{11}(2) \\ a_{12}(2) \end{pmatrix}$$

given by the item number 1 before two samples with respect to each sample value is expressed as follows.

$$I_1(2) = \begin{pmatrix} A_{11}(1) A_{12}(1) \\ A_{21}(1) A_{22}(1) \end{pmatrix} \begin{pmatrix} a_{11}(1) \\ a_{12}(1) \end{pmatrix} + \begin{pmatrix} A_{11}(2) \\ A_{21}(2) \end{pmatrix} \quad (6.4)$$

$$= A(1) I_1(1) + \begin{pmatrix} A_{11}(2) \\ A_{21}(2) \end{pmatrix}$$

When this relationship is expanded to the case where the order of the AR model is M and the number of items is n, the impulse response $$I_i(\tau) = \begin{pmatrix} a_{i1}(\tau) \\ a_{i2}(\tau) \\ \cdot \\ \cdot \\ \cdot \\ a_{ij}(\tau) \\ \cdot \\ \cdot \\ a_{in}(\tau) \end{pmatrix}$$

given by the change in the plant value (the item number i) before $\tau$ samples with respect to each plant value (the item number j) is expressed as follows.

$$I_i(\tau) = \sum_{l=1}^{\tau-1} A(l) I_i(\tau - l) + \begin{pmatrix} A_{1i}(\tau) \\ A_{2i}(\tau) \\ \cdot \\ \cdot \\ \cdot \\ A_{ji}(\tau) \\ \cdot \\ \cdot \\ A_{ni}(\tau) \end{pmatrix} \quad (6.5)$$

where $i, j = 1, 2, 3, \ldots, n$ and $\tau = 1, 2, \ldots, M$, and when $$\tau = 1, I_i(\tau) = I_i(1) = \begin{pmatrix} A_{1i}(1) \\ A_{2i}(1) \\ \cdot \\ \cdot \\ \cdot \\ A_{ji}(1) \\ \cdot \\ \cdot \\ A_{ni}(1) \end{pmatrix}$$

In addition, time constant $\tau_{ij}$ of the plant value (item number j) with respect to the plant value (item number i) is calculated on the basis of the following definition.

$$\{\tau \mid |a_{ij}(\tau)| \geq |a_{ij}(\tau')|; \tau' \neq \tau, (\tau = 1, 2, \ldots, M), (\tau' = 1, 2, \ldots, M)\}$$

Namely, $\tau_{ij}$ is defined as a value of $\tau$ which maximizes the absolute value of $a_{ij}(1), a_{ij}(2), \ldots, a_{ij}(\tau), \ldots, a_{ij}(M)$.

It is considered that, when the plant value of the item number i varies, the time constant $\tau_{ij}$ thus obtained indicates a sampling time duration which has the greatest influence of such a change on the plant value of the item number j.

For example, it is assumed that $a_{ij}$ calculated from the above equations (6.1) to (6.5) is evaluated as follows.
$a_{ij}(1) = -3.75$
$a_{ij}(2) = -4.71$
$a_{ij}(3) = 4.08$
$a_{ij}(4) = 6.10$
$a_{ij}(5) = 1.24$
$a_{ij}(6) = 5.02$
$a_{ij}(7) = 3.09$
$a_{ij}(8) = -2.89$
Because the absolute value of $a_{ij}(4)$ is the greatest, the time constant $\tau_{ij}$ is obtained as $\tau_{ij} = 4$.

The time constant $\tau_{ij}$ thus obtained is output from the time series of difference whiteness qualification means 212.

The time series of difference whiteness qualification unit 212 receives the time series of difference $\epsilon_i$ output from the time series of difference calculation unit 211 and the time constant $\tau_{ij}$ output from the time constant determination unit 213 to calculate an index for qualifying whiteness of the time series of difference. For this, correlation function expressed by the following equation (8) is first calculated.

$$\phi_{ij} = \frac{\sum_{s=1}^{N} \epsilon_i(s) \cdot \epsilon_j(s + \tau_{ij})}{\sqrt{\sum_{s=1}^{N} \epsilon_i(s)^2} \cdot \sqrt{\sum_{s=1}^{N} \epsilon_j(s + \tau_{ij})^2}} \quad (8)$$

Where i and j represent item number of the plant diagnostic model, respectively, s a sampling time point, and N the number of data for calculating the correlation function, and when i=j, $\phi_{ij}$ represents auto-correlation function.

Then, $\phi_{ij}$ calculated from the equation (8) is normalized using known means expressed by the following equation (9) and thus whiteness qualification index $AL_{ij}$ is obtained.

$$AL_{ij} = \frac{\sqrt{N-3}}{2} \log \frac{1 + \phi_{ij}}{1 - \phi_{ij}} \quad (9)$$

In this instance, since uncertainty of the plant diagnostic model is regarded as a negligible value, if the object 19 to be diagnosed is normal, the deviation $\epsilon_i$ occurs only when physical disturbance input is applied to the power generation plant 11. Accordingly, the time series of difference $\epsilon_i$ ordinarily becomes random values and therefore has whiteness. However, if any abnormality occurs in the object 19 to be diagnosed, the time series of difference $\epsilon_i$ has regularity. The above-mentioned whiteness qualification index $AL_{ij}$ is used as the index for qualifying regularity of the time series of difference $\epsilon_i$. This index $AL_{ij}$ indicates to what degree the time series of difference $\epsilon_i$ is correlated with the time series of difference $\epsilon_j$, which becomes zero when there is no correlation therebetween. In addition, $AL_{ij}$ indicates auto-correlation function, which serves as whiteness qualification index of the time series of difference $\epsilon_i$ itself.

The abnormality judgement unit 215 inputs the whiteness qualification index $AL_{ij}$ from the time series of difference whiteness qualification unit 212 to judge the plant subject to diagnosis to be abnormal when the whiteness qualification index $AL_{ij}$ is above a certain value ARL which is determined based on ratio of the erroneous judgement as described later.

The failure source determination unit 216 inputs the whiteness qualification index $AL_{ij}$ from the time series of difference whiteness qualification unit 212 and numbers corresponding to plant state variable and manipulated variable at an abnormal portion to determine the failure source. Particularly, the whiteness qualification index $AL_{ij}$ called auto-correlation function is used as index for determination of the failure source.

The alarm unit 217 informs an operator of abnormality or information from the abnormality judgement unit 215 and the failure source determination unit 216.

Figure 3:
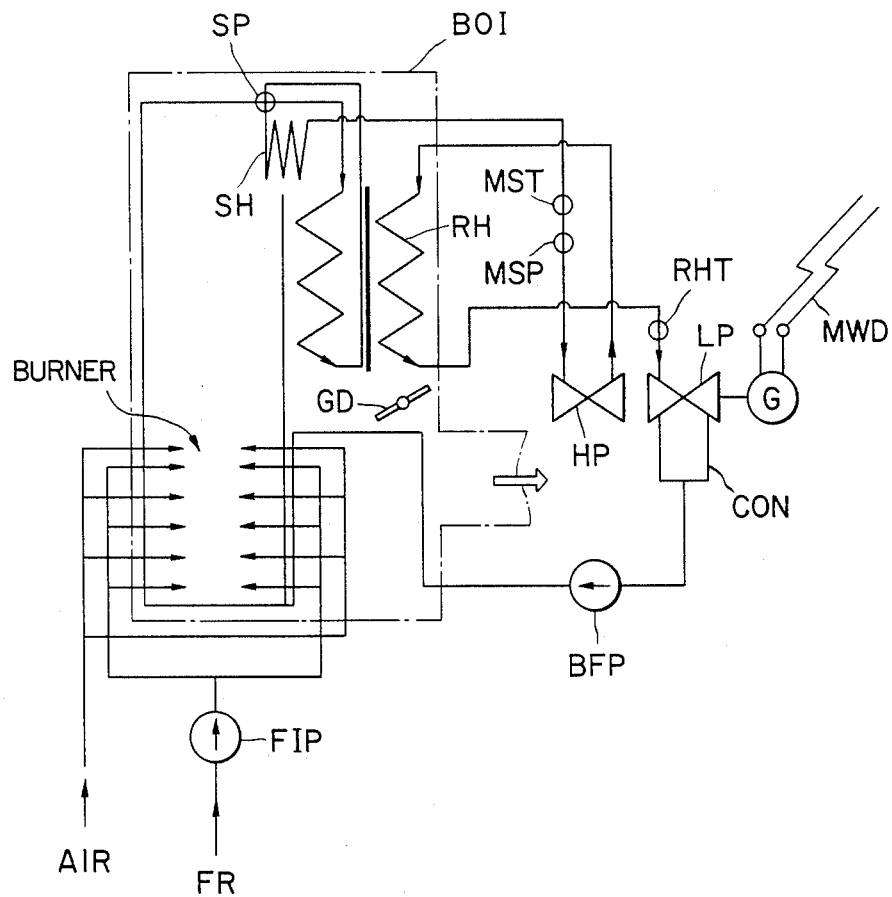
FIG. 3 is a conceptual view showing a thermal power plant to which the present invention is applied.

Explanation will be made in connection with the case where, for example, a thermal power plant shown in FIG. 3 is employed as the object 19 to be diagnosed in the configuration stated above, and three manipulated variables and four state variables are input from the object 19 to be diagnosed to the plant diagnostic system 22.

In FIG. 3, to a burner provided in a fire furnace of a boiler BOI, fuel FR is delivered through a pump FIP along with air AIR. On the other hand, water collected by a condenser CON is fed to the fire furnace of boiler BOI by means of a boiler feed water pump BFP. The water thus fed is changed into steam and then is delivered to a super heater SH. The steam is regulated so as to have predetermined temperature and pressure and the steam thus regulated is delivered to a high pressure turbine HP. The steam gives rotational force to the high pressure turbine HP to revolve a generator G, so that the steam having reduced temperature and pressure is obtained. The steam thus obtained is fed back to a reheater RH at which the process for increasing temperature and pressure is applied to the steam. The steam from the reheater RH is delivered to the low pressure turbine LP. The steam gives rotational force to the low pressure turbine LP to revolve the generator G, so that the steam having reduced temperature and pressure is obtained. The steam thus obtained is condensed into water by the condenser CON. The water thus obtained is circulated and delivered again to the boiler by the boiler feed water pump BFP.

In the thermal power plant thus configured, the above-mentioned three manipulated variables are water-fuel ratio (item number 1) of fuel FR, reheater gas damper GD (item number 2) and super heater spray SP (item number 3), and the above-mentioned four state variables are addition demand value MWD (item number 4), SH outlet temperature MST (item number 5), RH outlet temperature RHT (item number 6) and main steam pressure MSP (item number 7).

When the above-mentioned plant variables are input to the plant diagnostic section 21, the time series of difference calculation unit 211 outputs these plant variables to the plant diagnostic model 20 and takes therein estimated values of plant variables obtained based on calculation in the plant diagnostic model 20 in accordance with the previous outputs. Thus, the time series of difference calculation unit 211 compares these estimated values with plant values which are input this time from the object 19 to be diagnosed to calculate time series of difference $\epsilon_i$ of each plant variable to output the time series of difference $\epsilon_i$ thus computed to the time series of difference whiteness qualification unit 212.

In addition, the time constant determination means 213 inputs AR coefficient matrices $A(1), A(2), \ldots, A(M)$ from the plant diagnostic model 20 to calculate time constant $\tau_{ij}$ in accordance with the above-mentioned equations (6.5) and (7) to output the time constant $\tau_{ij}$ thus calculated to the whiteness qualification unit 212.

The time series of difference whiteness qualification unit 212 takes therein these time series of difference $\epsilon_i$ and time constant $\tau_{ij}$ to calculate whiteness qualification index $AL_{ij}$ for judging relationship between items and abnormality or normarity to output the whiteness qualification index $AL_{ij}$ thus calculated to the abnormality judgement means 215 and to the failure source determination unit 216. At this time, by precluding in advance calculation such as whiteness qualification index $AL_{63}$ from the state variable with respect to the manipulated variable etc. in connection with the abnormality which actually would not occur in the actual plant, for instance, "the abnormality of SH outlet temperature of the item number 5 has influence on SH spray of the item number 3", wasteful abnormality detection operation can be saved. Further, when seven plant values are grouped into manipulated variables and state variables and the whiteness qualification index $AL_{ij}$ is calculated, e.g., by making use of the relationship determined so that $i=1$ to 3 and $j=4$ to 7, it is also possible to simply manipulated variables which causes the state variable to be abnormal.

When the plant is normal, the time series of difference $\epsilon_i$ takes random value which becomes non-correlated value. The whiteness qualification index $AL_{ij}$ at this time depends upon the normal distribution $(0, 1)$ (having average of 0 and dispersion of 1).

Thus, the threshold level for judging whether there is correlation or not can be determined from the table showing the normal distribution so that, for example, $ARL=1.96$ at the erroneous diagnostic probability of 5% and $ARL=2.56$ at the erroneous diagnostic probability of 1%. Namely, when $|AL_{ij}| \leq ARL$, it is considered that the time series of difference has no correlation.

The abnormality judgement means 215 inputs $AL_{ij}$ indicative of the auto-correlation function of the above-mentioned whiteness qualification index $AL_{ij}$ to judge the item number i which satisfies the following relationship to be abnormal:

$$|AL_{ij}| > ARL.$$

The failure source determination means 216 inputs $AL_{ij}(i \neq j)$ indicative of cross-correlation function of the above-mentioned whiteness qualification index $AL_{ij}$ and the item number i judged to be abnormal by the abnormality judgement unit 215 to judge the abnormality of the state variable (the item number j) to be based on the failure of the manipulated variable (the item number i) in connection with the manipulated variable (the item number i) and the state variable (the item number j) of which both item numbers i and j are abnormal.

It is now assumed that the whiteness qualification index $AL_{ij}$ calculated by the whiteness qualification calculation unit 212 is expressed by the following Table 1 and the threshold value of the erroneous diagnostic probability of 5% is set to $ARL=1.96$.

TABLE 1

| | \multicolumn{7}{c}{Values of $AL_{ij}$} |
|---|---|---|---|---|---|---|---|
| i | 1 | 2 | 3 | 4 | 5 | 6 | 7 |
| 1 | β | — | — | β | β | β | β |
| 2 | — | α | — | β | β | α | β |
| 3 | — | — | β | β | β | β | β |
| 4 | — | — | — | β | — | — | — |
| 5 | — | — | — | — | β | — | — |
| 6 | — | — | — | — | — | α | — |
| 7 | — | — | — | — | — | — | β | where α is a value such that $|\alpha| > 1.96$, β represents a value such that $|\beta| = 1.96$ and each value of β does not indicate the same value, and indicates that calculation is not made on the basis of the relationship between the manipulated variable and the state variable.

In the abnormality judgement unit 215, the item numbers 2 and 6 are judged to be abnormal. Then, in the failure source determination means 216, the abnormality of the item number 6 is judged to be based on the failure of the item number 2.

These results are output to the alarm unit 217 and they are output from the alarm unit 217 in accordance with the following format.

| TIME | STATE VARIABLE | ABNORMAL. PLEASE CHECK | FAILURE SOURCE | -P.DIAG- |

Portions encompassed by blocks are those varying depending upon the state at that time. When the failure source is not determined, the portion of "PLEASE CHECK FAILURE SOURCE " is not output. In the example of the above-mentioned TABLE 1, indication expressed below is output:

| 10:00 RHT ABNORMAL. PLEASE CHECK GD. -P.DIAG- | where RHT represents RH exit temperature of the item number 6, GD RH gas damper of the item number 2, and output time ten o'clock.

Thus, still in the case where the RH gas damper becomes abnormal and this abnormality has influence on the RH exit temperature with a certain time delay, the abnormal portion can be exactly grasped.

In addition to the above-mentioned embodiment, the present invention may be implemented as follows.

(1) The above-mentioned embodiment has been described in connection with the case where the present invention is applied to the thermal power plant, but it is needless to say that the present invention is applicable to abnormality diagnosis of various plants without limiting to the above-mentioned embodiment.

(2) In the above-mentioned embodiment, plant state variables used for the diagnosis of plant are taken in directly from the power generation plant. Instead thereof, these state variables can be provided for as the APC 12 input and therefore they may be input from the APC 12.

(3) In the identification of the plant diagnostic model, the method was employed to vary at random load demand value which was a specified plant state variable thereby to derive mathematical model of the object 19 to be diagnosed. However, it is not required that the load demand value is necessarily used in any plant and it is of course that various plant state variables can be selected in accordance with the characteristic of the object 19 to be diagnosed.

(4) For identification of the plant diagnostic model, random signal such as M-series signal were used. In addition, it is possible to identify the plant diagnostic model with another random signal such as pseudo-random number.

(5) When not only the signal varying at random but also a step signal or ramp signal is applied to the state variable (the load demand value in the example shown in FIG. 3) which has the greatest influence on the object 19 to be diagnosed, a method may be employed to test in advance change of the whiteness qualification index $AL_{ij}$ based on the plant diagnostic model 20, thereby to independently determine values of the threshold level ARL per each state variable.

(6) In the above-mentioned embodiment, the threshold level ARL was fixed. However, when disturbance which can be measured e.g., large change in load is applied to the object 19 to be diagnosed, for reducing the possibility of the erroneous diagnosis, it is possible to allow the threshold level ARL to be variable in accordance with the change in the disturbance which can be measured.

(7) When the diagnostic result is grasped on the basis of elevation of the abnormal level, it is possible to inform an operator of the approach to the alarm region for paying an attention to the operator and thus this can be utilized for preventing accident.

As described above, according to the present invention, while effecting the control of a plant, the diagnosis of the entirety of the plant including its control status can be carried out. In the implementation of the diagnosis, the characteristic of the entire plant is first obtained from the plant diagnostic model in terms of time constant, and then the diagnosis is actually conducted. Accordingly, this makes it possible to identify abnormality or failure source in conformity with the characteristic of the object to be diagnosed. In addition, since it is unnecessary to test the plant for obtaining the time constant, the plant can be effectively used as compared to other methods.

What is claimed is:

1. A plant diagnosis system comprising:
a plant diagnostic model for representing a plant system to be diagnosed by a mathematical model;
first means for determining a time constant at which a change of one plant value has the greatest influence on the plant value or other plant values by using a coefficient matrix of an auto-regressive model;
second means for calculating a time series of residual difference from an estimated value calculated by using said plant diagnostic model and an actual plant value obtained from said plant system so as to obtain the time series of residual differences;
third means for qualifying whiteness of the time series of residual difference from said second means and the time constant from said first means so as to produce an index;
fourth means for determining an abnormality from the index produced by said third means;
fifth means for determining a failure source from the index and the result; and
sixth means for outputting the abnormality and the failure source according to the results obtained by said fourth means and said fifth means.

2. A plant diagnostic system as set forth in claim 1, wherein said first means calculates impulse response $a_{ij}(\tau)$ indicating to what degree a change of a certain plant value (item number i) affects a change of another plant value (item number j) from said auto regressive model when auto regressive coefficient matrices $$A(1), A(2), \ldots, A(M) \text{ expressed as } \widehat{X}(s) = \sum_{m=1}^{M} A(m) \cdot X(s-m)$$

are given, thus to calculate said time constant $\tau_{ij}$ which has the greatest influence.

3. An apparatus, comprising:
a plant system having a plurality of plant variables with actual values;
a plant diagnostic model comprising a mathematical model for calculating estimated values of said plant variables;
time constant means for determining time constants at which a change of each of said plant variables has the greatest influence on the other of said plant variables;
difference determining means for determining differences between said estimated values of said plant variables and said actual values of said plant variables; and
means for determining an abnormality and a cause of said abnormality based on said differences determined by said difference determining means and said time constants determined by said time constant determining means.

* * * * *